United States Patent [19]

Poplawski et al.

[11] Patent Number: 5,864,468
[45] Date of Patent: Jan. 26, 1999

[54] REMOVABLE OPTOELECTRONIC MODULE WITH GROUNDING MEANS

[75] Inventors: Daniel S. Poplawski, Montgomery; Alan J. Wallenberg, Villa Park; Patrick B. Gilliland, Chicago, all of Ill.

[73] Assignee: Methode Electronics, Inc., Chicago, Ill.

[21] Appl. No.: 538,897

[22] Filed: Oct. 4, 1995

Related U.S. Application Data

[63] Continuation-in-part of Ser. No. 417,914, Apr. 6, 1995, Pat. No. 5,717,533, which is a continuation-in-part of Ser. No. 372,780, Jan. 13, 1995, Pat. No. 5,546,281.

[51] Int. Cl.[6] .................................................. H05K 5/00
[52] U.S. Cl. ..................... 361/753; 361/752; 361/799; 385/92; 385/94
[58] Field of Search .................................. 385/88, 89, 92, 385/94; 361/752–759, 796–803, 816, 818; 439/76.1, 131, 153, 74, 77, 493, 465, 466, 469, 946; 257/432, 433

[56] References Cited

U.S. PATENT DOCUMENTS

| | | | |
|---|---|---|---|
| 4,510,553 | 4/1985 | Faultersack | 361/788 |
| 4,539,476 | 9/1985 | Donuma et al. | 250/227.24 |
| 5,202,943 | 4/1993 | Carden et al. | 385/92 |
| 5,434,747 | 7/1995 | Shibata | 361/753 |
| 5,548,677 | 8/1996 | Kakii et al. | 385/92 |

Primary Examiner—Michael W. Phillips
Assistant Examiner—Phuong T. Vu
Attorney, Agent, or Firm—David L. Newman

[57] ABSTRACT

A robust optoelectronic transceiver module which provides for static discharge and is quick, easy, and inexpensive to manufacture. The transceiver module has a main housing which consists of a potting box with potting material inserted therein. In addition, a circuit board is encased by the potting material. The circuit board has an optical subassembly mounted thereon. The optical subassembly extends outside of the potting box through a recess. Correspondingly, a recess cover is provided for forming a liquid tight seal between the recess cover, the potting box, and the optical subassembly. Furthermore, the module provides electrically conductive latches which are conductively connected, via tabs for forming an electrical connection, to a grounded structure, such as a computer chassis.

23 Claims, 4 Drawing Sheets

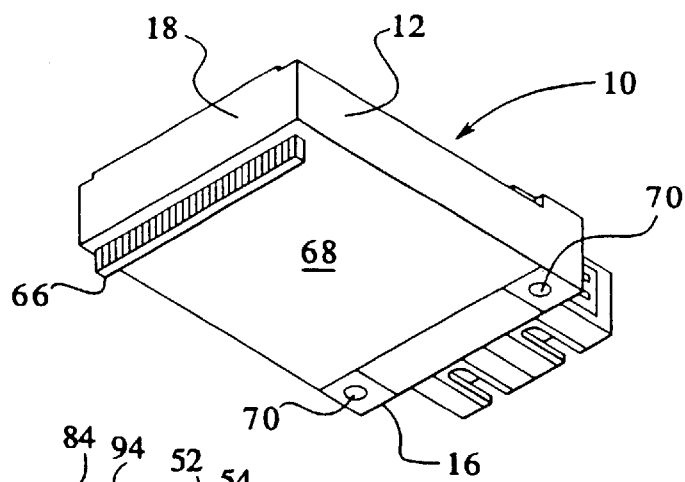
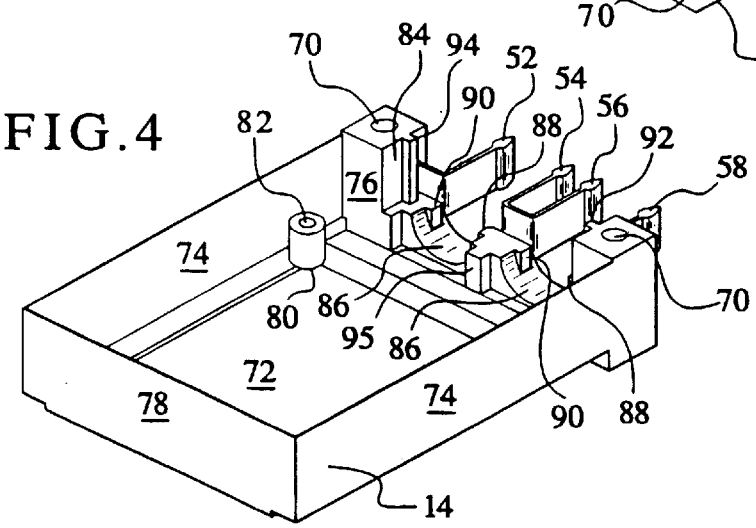
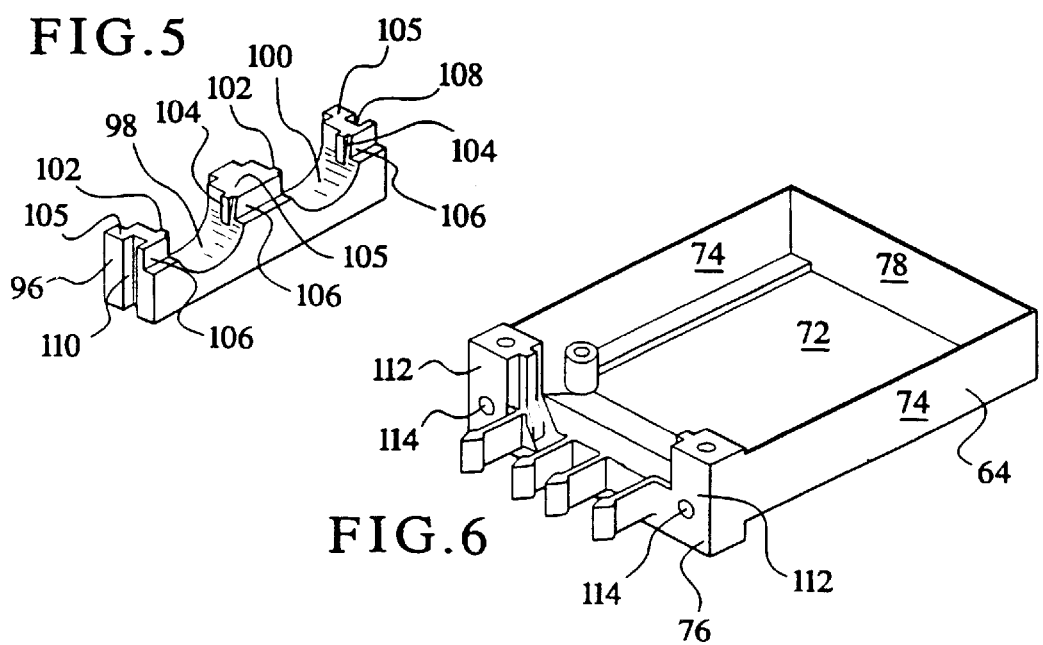

REMOVABLE OPTOELECTRONIC MODULE WITH GROUNDING MEANS

This application is a continuation-in-part of U.S. Ser. No. 08/417,914, filed Apr. 6, 1995, now U.S. Pat. No. 5,717,533, which is a continuation-in-part of U.S. Ser. No. 08/372,780, filed Jan. 13, 1995, now U.S. Pat. No. 5,546,281.

BACKGROUND OF THE INVENTION

This invention relates generally to optoelectronic transceiver modules and in particular, it relates to an optoelectronic transceiver module, and its method of manufacture, whereby the module is inexpensive to manufacture, has a small yet robust package, provides for static discharge, and can be installed and replaced via a ribbon style connector.

Optoelectronic transceiver modules provide for the bi-directional transmission of data between an electrical interface and an optical data link. The module receives electrically encoded data signals which are converted into optical signals and transmitted over the optical data link. Likewise, the module receives optically encoded data signals which are converted into electrical signals and transmitted onto the electrical interface.

Normally, the transceiver is mounted onto one of the circuit card assemblies of a host computer, input/output system, peripheral device, or switch. Therefore, as with all electronic equipment, there is a need for a transceiver having an outer package design which occupies as little circuit card surface area as possible.

In addition, there is a need for a transceiver module which is highly reliable and durable. One method presently used to ensure reliability and durability is to encapsulate the electronics of the transceiver within an insulative potting material. Encapsulating the transceiver electronics results in reducing vibration sensitivity and prevents unauthorized personnel from meddling with the module's electronics.

Presently, the molding of the potting material around the transceiver electronics is performed by placing the electronics within a silicone mold. Any portion of the electronics which extends outside of the mold is caulked, by hand, with a silicone compound which provides for a liquid tight seal. Once the mold is sealed, potting material is inserted therein. After the potting material is allowed to cure, the silicone mold is peeled away from the newly formed module.

The above described prior art molding process has several drawbacks. For example, it is time consuming and results in a transceiver module which has a pitted outer surface. In addition, the silicone mold used in the molding process has a limited life of only three to five modules before a new mold must be employed.

The optoelectronic module is provided with a plurality of electrical pins for forming an electrical connection with a circuit card assembly. The electrical pins consist of solid wire strands with each pin having one end connected to the electronics within the module and the other end protruding from the module's potting material.

The portion of each pin which protrudes from the potting material is either soldered within a plated through-hole, which is provided by the circuit card assembly, or placed within a connector which grasps onto the pin. However, the flimsy wire pins are very susceptible to deformation during both the normal handling of the module and its removal and installation onto a circuit card assembly. Thus, the flimsy pins currently used in the prior art are difficult and time consuming to attach to a circuit card assembly since they must be periodically inspected and realigned. Furthermore, the pins may break if they are realigned too many times.

In addition to the electrical pins, the module also is equipped with two mounting ports for physically securing the module onto the circuit card assembly. The module is placed onto the circuit card assembly so that the mounting ports align with holes provided in the circuit card assembly. Once the module is properly aligned, screws are inserted through the holes in the circuit card assembly and into the mounting ports of the module. The screws are then tightened until the module is firmly affixed to the circuit card assembly.

Similarly, to remove the module from the circuit card assembly, the screws must be removed and the wires either unsoldered from the circuit card or pulled from the connector which is a timely and expensive process requiring multiple components.

Finally, once the module is secured to the circuit card assembly, optical fibers contained within an SC duplex plug connector are mated to the module. Normally, the SC duplex connector has a plastic housing which may be statically charged. Thus, its connection onto the transceiver module may result in damage to the electronic components within the module unless proper grounding of the SC connector is provided.

It should be appreciated by those skilled in the art that the possibility of damage due to static discharge is not only applicable to transceiver modules which mate with an SC duplex connector. Other optoelectronic modules, such as, for example, Gigabaud Link Modules (GLM), are also susceptible to static discharge damage whenever they are mated to a connector containing optical fibers.

Therefore, there is a need for a transceiver module which provides for a small, yet robust package, which is inexpensive to manufacture, provides for static discharge, and can easily and quickly be installed and removed from a circuit card assembly. The present invention is such an apparatus.

Likewise, there is a need for preventing a statically charged fiber optic connector from damaging the electronics within an optoelectronic module.

In view of the above, it is an object of the present invention to provide a small transceiver module package.

It is another object of the present invention to provide a module package that has a robust and tamper resistent design.

Also, it is an object of the present invention to provide a module which can quickly be installed and replaced from a circuit card assembly.

Another object of the present invention is to provide a module package design that can quickly and easily be produced.

A further object of the present invention is to provide a module package that can be produced inexpensively.

It is yet another object of the present invention to prevent a statically charged connector from damaging the electrical circuitry within an optoelectronic module by pre-grounding the plug connector.

Furthermore, it is an object of the present invention to provide a module with a coating which dissipates an electrostatic discharge and serves as an electromagnetic shield.

SUMMARY OF THE INVENTION

In one form of the invention, a robust optoelectronic transceiver module is provided which is quick, easy, and inexpensive to manufacture. The transceiver module has a main housing which consists of a potting box with potting material inserted therein. In addition, a circuit board is encased by the potting material.

The invention further provides for an optical subassembly to be mounted on a circuit board. In addition, the potting box has a recess which allows the optical subassembly to extend outside of the potting box. Furthermore, a recess cover may be provided for forming a liquid tight seal between the recess cover, the potting box, and the optical subassembly.

The optoelectronic transceiver module may also have a ribbon style connector attached to the circuit board and protruding from the main housing. The ribbon style connector may protrude from either the bottom or one end of the main housing. In addition, the ribbon style connector may comprise of either a male ribbon style connector or a resilient male ribbon style connector.

In another form of the invention, an optoelectronic transceiver module is provided which mounts onto a circuit card assembly. The module has a main housing with a bottom. Protruding from the bottom of the main housing is a ribbon style connector which allows for quickly installing and replacing the module from the circuit card assembly.

In yet another form of the invention, a method of assembling an optoelectronic transceiver module is provided. The steps of the method consists of placing a circuit board within a potting box and injecting potting material within the potting box. In addition, the circuit board may be affixed within the potting box after the circuit board is positioned within the potting box. Furthermore, a liquid tight recess cover may be mounted within the potting box's recess after the circuit board is positioned within the potting box.

Also, the method of manufacture provides for coating the potting box with a conductive metal before the circuit board is placed within the potting box or after the potting material is injected within the potting box. Moreover, a connector shell may be mounted onto the potting box after the potting material is injected within the potting box.

In still another form of the invention, a method of assembling an optoelectronic transceiver is provided which includes the steps of affixing a circuit board within a housing and securing a conductive metal coating onto the housing.

In another form of the invention, a potting box is provided for potting optoelectronic components which include an optical subassembly. The potting box includes a wall having a recess which allows the optical subassembly to extend outside of the potting box. In addition, a recess cover is provided for forming a liquid tight seal between the recess cover, the potting box, and the optical subassembly. Furthermore, the invention provides for the potting box to have a standoff column for mounting a circuit board within the potting box and an alignment guide for engaging a groove within the recess cover.

In yet another form of the invention, an optoelectronic module is provided for mounting within a grounded structure, such as a computer chassis. The optoelectronic module consists of electrically conductive latches which are conductively connected to a structure which provides for the forming of an electrical connection with the grounded structure. The optoelectronic transceiver module may further include a transceiver connector attached thereto and which is conductively connected to the latches. Furthermore, a grounding clip may be attached to the transceiver connector. The grounding clip may have at least one tab extending therefrom. Accordingly, the optoelectronic module may use at least one tab for conductively connecting the latches to the grounded structure.

Various means for practicing the invention and other advantages and novel features thereof will be apparent from the following detailed description of an illustrative preferred embodiment of the invention.

BRIEF DESCRIPTION OF THE DRAWINGS

There is shown in the drawings a preferred embodiment of the present invention, wherein like numerals in the various figures pertain to like elements, and wherein:

FIG. 3 is a bottom perspective view of the optoelectronic transceiver module depicted in FIG. 1;

FIG. 4 is an enlarged perspective view of the potting box used in the manufacture of the optoelectronic module depicted in FIGS. 1–3;

FIG. 5 is a perspective view of the recess cover used with the potting box of FIG. 4;

FIG. 6 is another enlarged perspective view of the potting box of FIG. 4;

DETAILED DESCRIPTION OF THE PRESENTLY PREFERRED EMBODIMENTS

Figure 1:
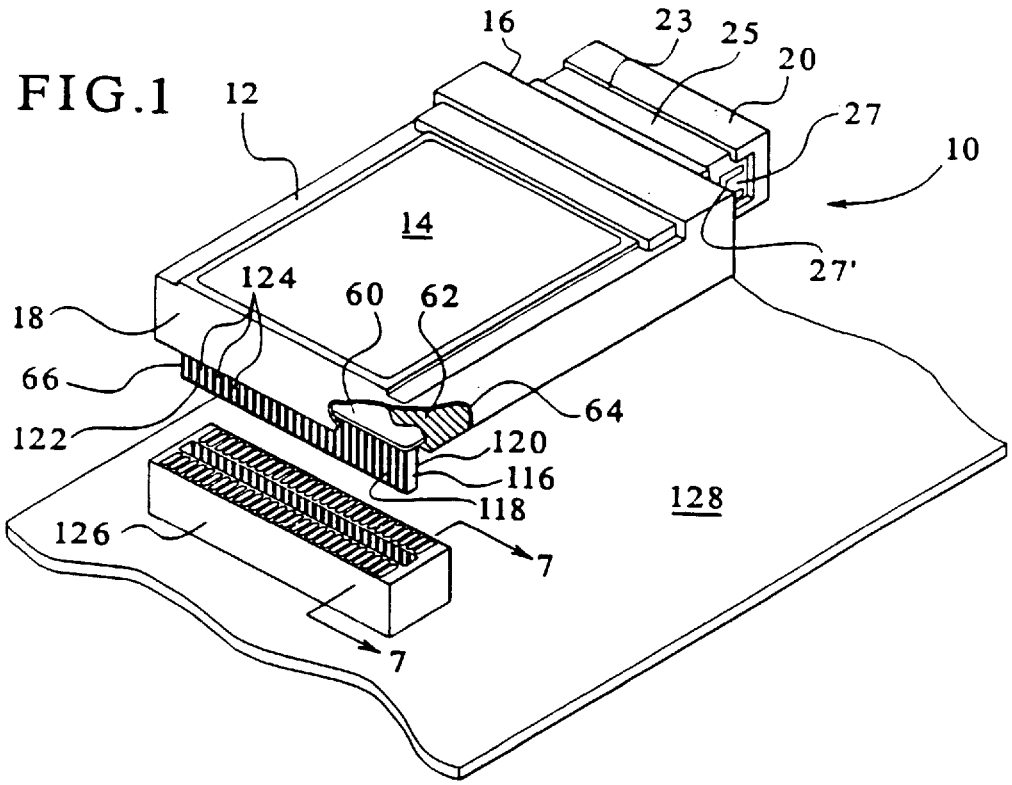
FIG. 1 is an enlarged perspective view of an optoelectronic transceiver module in accordance with the present invention and having a partial fragmentary view depicting the module's circuit board and potting material.

Referring to the drawings, and particularly to FIG. 1, an enlarged perspective view of an optoelectronic transceiver module 10 in accordance with the present invention is depicted. The module 10 has a main housing 12 which generally has the shape of an oblong box. The main housing 12 has a generally rectangular top 14 with a first end 16 and an opposite second end 18 extending perpendicularly from the top. Attached to the first end 16 of the main housing 12 is a transceiver connector 20 for receiving fiber optic plugs.

Figure 2:
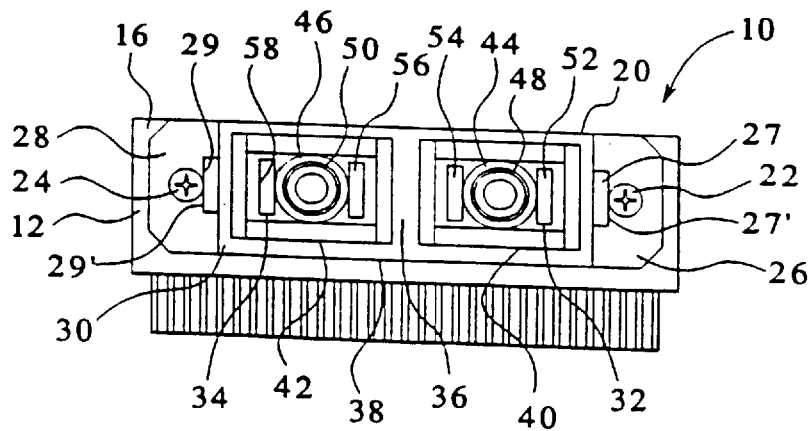
FIG. 2 is a front view of the optoelectronic transceiver module depicted in FIG. 1.

Turning to FIG. 2, a front view of the optoelectronic transceiver module 10 is depicted. The transceiver connector 20 is attached to the first end 16 of the main housing 12 by two screws 22,24. The two screws 22,24 extend through the transceiver connector's mounting ears 26,28 and into the main housing 12. Extending perpendicularly from the mounting ears 26,28 is a generally rectangularly shaped connector shell 30. The connector shell 30 provides two receptacles 32,34 for receiving fiber optic connector plugs. The receptacles 32,34 are formed by the connector shell 30 along with a divider wall 36 which extends along the center of the connector shell. Furthermore, located in the bottom 38 of each receptacle 32,34 is a keying channel 40,42 which extends toward the first end 16 of the main housing.

In the preferred embodiment, the receptacles 32,34 of the connector shell 30 are specifically dimensioned to receive an SC duplex plug. Therefore, the keying channels 40,42 ensure that an SC plug will be inserted so that receptacle 32 will only accept a plug for sending data and receptacle 34 will only accept a plug for receiving data.

Extending from the main housing 12 and into each of the receptacles 32,34 is an optical subassembly 44,46. As previously indicated, the optical subassembly 44 is for sending transmissions over a data link and the optical subassembly 46 is for receiving transmissions over a data link. In order to facilitate the connection between the transceiver 10 and the data links, each optical subassembly has a ferrule receiving portion 48,50. The ferrule receiving portion 48,50 couples with the SC plug. Furthermore, the transceiver's latch members 52,54,56, and 58 firmly hold the SC plug in contact with connector 20.

The actual sending and receiving of optically encoded data is performed by a laser diode within the optical subassembly 44 and a photo diode within the optical subassembly 46. Both the laser diode and the photo diode are electrically connected to a circuit board which is mounted within the main housing 12.

Turning back to FIG. 1, a portion of the circuit board 60 is depicted. Incorporated onto the circuit board 60 is circuitry for transmitting and receiving optically encoded data (circuitry not shown). The circuit board 60 is encased in potting material 62 and a potting box 64 which forms the main housing 12. The potting material 62 encases the circuit board 60 such that only the circuit board's male ribbon style connector 66 extends from the potting material 62.

Turning to FIG. 3, a perspective view of the bottom 68 of the transceiver module 10 is depicted. In the preferred embodiment, the bottom 68 has two mounting ports 70,70 which are adjacent to the first end 16 of the main housing 12. In addition, the male ribbon style connector 66 protrudes perpendicularly from the bottom 68 and is adjacent to the second end 18 of the main housing 12.

In an alternative embodiment, the ribbon style connector 66 may protrude perpendicularly from the second end 18 of the module 10 so that it can be connected to a circuit card assembly in a direction which is parallel to the direction of insertion of the optic plugs into the module's receptacles. However, in this alternative embodiment, another recess cover will be needed in order to prevent potting material from escaping the second end of the potting box.

Referring to FIG. 4, an enlarged perspective view of the optoelectronic module's potting box 64 is depicted. The potting box 64 forms the outer housing of the optoelectronic module. Thus, the potting box generally has the shape of an oblong box with a rectangular bottom 72, two parallel side walls 74,74, a first end wall 76, and an opposite second end wall 78. In a preferred embodiment, the potting box 64 is injection molded of a polymer material such as VALOX, STANYL, or any other glass-filled heat resistant material which can withstand solder reflow temperatures. The use of such a potting box eliminates the need for a silicone mold required by prior art modules.

In addition, it is preferred that the potting box 64, including the latch members 52,54,56, and 58, be either plated, wet plated, or vacuum metalized with an aluminum or stainless steel coating in order to dissipate an electrostatic discharge and provide for electromagnetic shielding. As well, the transceiver connector 20 (FIG. 1) may be either plated, wet plated, or vacuum metalized, in order to reduce emissions and enhance grounding of the module. Such metalization of the connector 20 can bring the module in compliance with FCC Rules, Part 15. In a preferred embodiment, the connector 20 is metalized separately from the potting box 64 so that each attachment portion is metalized and provides for conductivity between the parts. As the connector 20 will be attached to a chassis containing fiber optic connectors which are at ground potential, the connector will ground the metalized potting box 64 which is attached to a daughter board. Such grounding enhances the module's ability to dissipate electrostatic discharge and provide for electromagnetic shielding.

As also shown in FIGS. 1–3, the transceiver connector 20 includes a grounding clip 25 attached at the slot 23 in the connector 20. The grounding clip 25 serves as a means for forming an electrical connection with an externally grounded structure such as a computer chassis. Correspondingly, the grounding clip 25 is made of a metallic material, such as stainless steel, and includes two tabs 27,29 which protrude from each side of the connector 20. The tabs 27,29 are generally rectangular in shape with only one side of each tab being united to the grounding clip 25. Correspondingly, each tab 27,29 has a respective distal end 27',29' which extends away from the connector 20. In a preferred embodiment, the connector 20 is first metalized and then the ground clip 25 is attached so that an electrical conductive path is maintained between the grounding clip 25 and the connector 20.

As previously indicated, all of the transceiver's latch members 52, 54, 56, and 58 extend from the first wall 76 of the potting box 64. Also, the first end wall 76 of the potting box furnishes the mounting ports 70,70 which are located on the bottom of the main housing. In a preferred embodiment, the latch members 52, 54, 56 and 58 are integrally molded with the potting box 64.

Circuit board standoff columns 80 are also provided by the potting box 64 (only one standoff column is depicted in FIG. 4). Each standoff column protrudes from the bottom 72 of the potting box 64 and is positioned next to the first end wall 76 and one of the side walls 74,74 for supporting the circuit board 60. The standoff columns 80 have a length equal to approximately half the depth of the potting box 64 with the distal end of the column having a circuit board mounting port 82.

As depicted in FIG. 4, the first wall 76 of the potting box 64 has a recess 84 for allowing the placement of the circuit board's optical subassemblies. The recess 84 has two semicircular through-ports 86,86. Within each through-port 86,86 are two guide beams 88,90 which are positioned on each end of the through-port's semicircle for positioning the optical subassemblies 44,46.

Also located on the first wall 74 are two recess cover alignment guide beams 92,94. The alignment guide beams 92,94 boarder each side of the recess 84 and extend along the entire depth of the recess. The bottom of the recess 84 has three flat mating surfaces 95 (only two of the mating surfaces are depicted in FIG. 4).

Correspondingly, referring to FIG. 5, a recess cover 96 is depicted for placement within the recess located in the first wall of the potting box. Preferably, the recess cover 96 is made of the same material as the potting box and is either plated, wet plated, or vacuum metalized with an aluminum or stainless steel coating.

In FIG. 5, the recess cover 96 has two semicircular through-ports 98,100. Within each of the through-ports 98,100 are two guide beams 102,104 positioned on each end of the through-port's semicircle. Also, the top of the recess cover includes three flat mating surfaces 105.

The recess cover 96 firmly mounts within the recess of the potting box's first wall so that the mating surfaces 95 and 105 of both the recess 84 and the recess cover 96 will abut each other. The recess cover 96 includes three indentions 106 which allow the cover to be positioned around the location where the latch members 52, 54, 56, and 58 attach to the potting box. In addition, on each end of the recess cover 96 there are alignment grooves 108,110 which provide for sliding engagement with the alignment guide beams 92,94 bordering the recess within the potting box's first wall.

Referring back to FIG. 4, during the manufacture of the transceiver module the circuit board is placed in the potting box 64 with the male ribbon connector protruding outside of the potting box and the circuit board's optical subassemblies protruding out of the recess 84 in the first wall 76. The optical subassemblies 44,46 are properly positioned within the potting box 64 by the alignment guides 88,90 located within each through-port 86,86.

Once positioned within the potting box 64, the circuit board 60 is affixed by two screws which are mounted to the standoff columns 80 via the circuit board mounting ports 82.

Once the circuit board 60 is secured within the potting box 64, the recess cover 96 is mounted onto the first end wall 76. The recess cover 96 is mounted by engaging its alignment grooves 108,110 with the potting box's recess cover alignment guide beams 92,94. When the recess cover 96 is slid into position, the cover's through-ports 98,100 and associated alignment guide beams 102,104 will adjoin the circuit board's optical subassemblies 44,46. Furthermore, due to the tight tolerances of both the potting box 64 and the recess cover 96, a liquid tight seal will be formed between the potting box 64, the recess cover 96, and the optical subassemblies 44,46. Thus, with the recess cover 96 in place, potting material is injected within the potting box 64 for encasing the circuit board 60. The time to mold the module by the above method is reduced by approximately 90% over the prior art molding process because no hand caulking is needed to form the liquid tight seal.

Finally, referring to FIG. 6, the connector shell 20 (See FIG. 1 & 2) is mounted onto the first end wall 76 of the potting box 64 after the potting material has cured. Alignment of the connector shell 20 is provided by two mounting posts 112,112. Each mounting post 112 has a bore 114 which facilitates the attachment of the connector shell 20, by the use of the previously mentioned screws, onto the potting box 64.

In an alternative embodiment, the ribbon style connector 66 may protrude perpendicularly from the second end 18 of the module 10 so that it can be connected to a circuit card assembly in a direction which is parallel to the direction of insertion of the optic plugs into the module's receptacles. However, in this alternative embodiment, another recess cover will be needed in order to prevent potting material from escaping the second end of the potting box.

Referring back to FIG. 1, the male ribbon style connector 66 protruding from the module 10 has a beam portion 116, made of insulative material, which extends perpendicularly across the length of the circuit board 60. The male ribbon style connector 66 also has a first side 118, an opposite second side 120, and a distal end 122. Extending perpendicularly from the circuit board 60 on both the first side 118 and the second side 120 of the male ribbon style connector 66 are twenty-eight electrical contacts 124. Each electrical contact 124 consists of a strip of conductive material which is affixed to the male ribbon style connector 66 and is electrically connected to the circuitry mounted on the circuit board 60.

Figure 7:
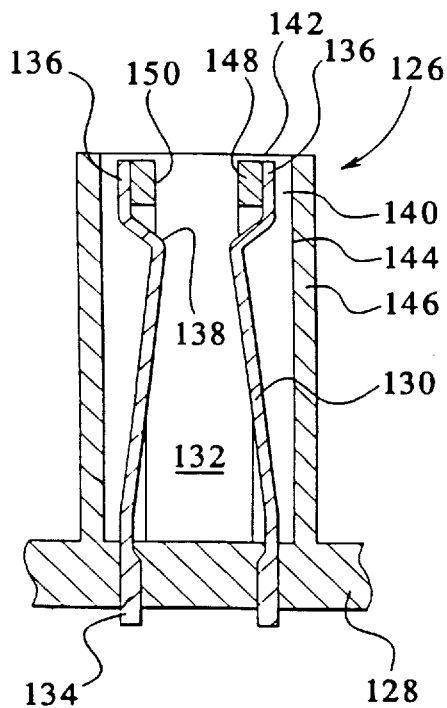
FIG. 7 is an enlarged cut-away side view of the female ribbon style connector taken along line 7—7 of FIG. 1.

Correspondingly, the male ribbon style connector 66 couples to a female ribbon style connector 126 which is mounted onto the circuit card assembly 128. Referring to FIG. 7, an enlarged cut-away side view is shown of the female ribbon style connector 126 taken along line 7—7 of FIG. 1. The female ribbon style connector 126 has two parallel rows of twenty-eight (28) contact beams 130,130 contained within a contact chamber 132 (only one contact from each row is depicted). Each contact beam 130 is constructed of a flat strip of conductive metallic material. Furthermore, each contact beam 130 has a first end 134, a second distal end 136, and a bend 138 which is located adjacent to the second end and extends toward the contact beam located in the opposite row.

The female ribbon style connector 126 is mounted onto the circuit card 128 such that the first end 134 of each contact beam 130 extends through the circuit card assembly. Likewise, the second end 136 of each contact beam 130 extends within a travel limitation slot 140 formed in the top 142 of the female ribbon style connector 126. Each slot 140 provides a backstop 144, consisting of one of the connector's walls 146, and a frontstop 148. Correspondingly, contact beams 130,130 are positioned in the chamber 132 such that the second end 136 of each contact beam 130 resiliently urges against the frontstop 148.

In order to provide access to the contact beams 130,130 within the female ribbon style connector 126, the top 142 of the connector has a slot 150 positioned between the two rows of contact beams. Correspondingly, in order to make an electrical connection between the female ribbon style connector 126 and the male ribbon style connector 166 depicted in FIG. 1, the distal end 122 of the male ribbon style connector is inserted within the female connector's slot 150. As the male ribbon style connector 66 is pushed further within the female connector's chamber 132 the two rows of contact beams 130,130 will be forced to sperate further from each other. In addition, each contact beam 130 will resiliently urge against a corresponding electrical contact 124 mounted on the male ribbon style connector 66. Thus, an electrical connection will be formed between the male ribbon style connector's electrical contacts 124,124 and the female connector's contact beams 130,130.

Similarly, to disconnect the male ribbon style connector's electrical contacts 124,124 from the female connector's contact beams 130,130 the male connector 66 is simply pulled from the chamber 132 of the female connector. Once the male ribbon style connector 66 has been removed from the chamber 132, the contact beams 130 of the female connector 126 will resiliently regain the configuration of FIG. 7, whereby the second end 136 of each contact beam will abut its corresponding frontstop 148.

Figure 8:
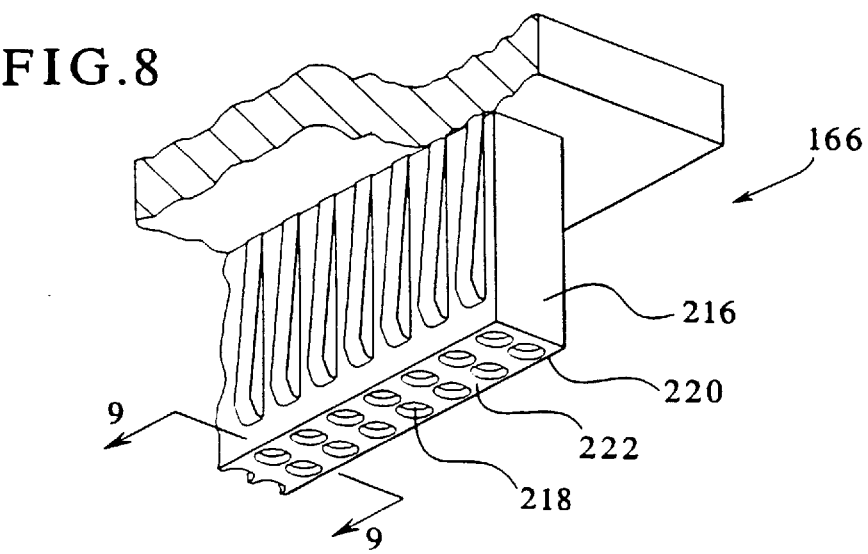
FIG. 8 is an enlarged perspective view, along with a partial fragmentary view, of a resilient male ribbon style connector for use with the optoelectronic transceiver module of FIGS. 1–3.

Turning to FIG. 8, an enlarged perspective view, along with a partial fragmentary view, is depicted of a resilient male ribbon style connector 166. The connector 166 includes a beam type housing 216 having a first side 218, an opposite second side 220, and a distal end 222. The resilient male ribbon style connector 166 in FIG. 8 serves as another embodiment of the male ribbon style connector depicted in FIGS. 1–3 wherein the male connector in FIG. 8 is resilient and the male connector in FIGS. 1–3 is non-resilient. It should be noted, however, that other means for quickly installing and replacing the module from a circuit card assembly may be used.

Figure 9:
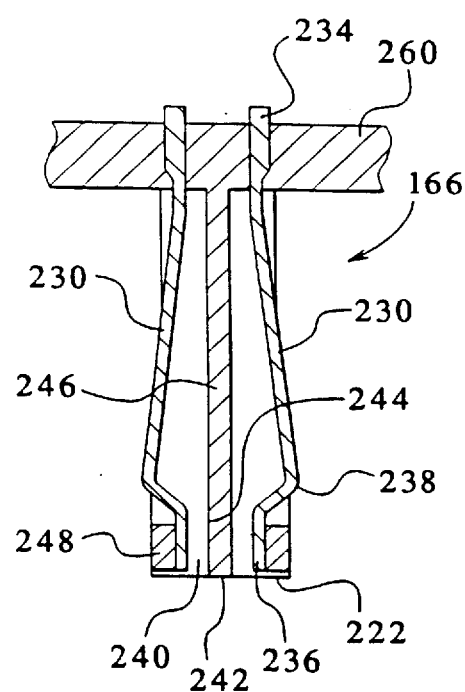
FIG. 9 is a cut-away side view of the resilient male ribbon style connector taken along line 9—9 of FIG. 8.

Referring to FIG. 9, an enlarged cut-away side view of the resilient male ribbon style connector 166 is shown taken along line 9—9 of FIG. 8. The male ribbon style connector 166 has two parallel rows of twenty-eight (28) contact beams 230,230 (only one contact from each row is depicted). Each contact beam 230 is constructed of a flat strip of conductive metallic material. Furthermore, each contact beam 230 has a first end 234, a second distal end 236, and a bend 238 which is located adjacent to the second end and extends away from the contact beam located in the opposite row.

The male ribbon style connector 166 is mounted onto the module's circuit board 260 such that the first end 234 of each contact beam 230 extends through the circuit board. In a preferred embodiment, the first end 234 of the contact 230 is inserted within a through-hole of the circuit board 260 which contains traces for providing an electrical connection from the contact 260 to components mounted on the board. Likewise, the second end 236 of each contact beam 230 extends within a travel limitation slot 240 formed in the top 242 of the resilient male ribbon style connector 166. Each slot 240 provides a backstop 244, consisting of the connector's support wall 246, and a frontstop 248. Correspondingly, contact beams 230,230 are positioned such that the second end 236 of each contact beam 230 resiliently urges against the frontstop 248.

Access for making an electrical connection with the contact beams 230,230 is provided since they protrude from the male ribbon style connector 166 in the area around the bends 238,238. Correspondingly, in order to make an electrical connection between a female ribbon style connector and the resilient male ribbon style connector 166, the distal end 222 of the male ribbon style connector is inserted within a slot provided by the female connector. As the male ribbon style connector 166 is pushed within the female connector, the two rows of contact beams 230,230 will be forced to compress towards each other. In addition, each contact beam 230 will resiliently urge against a corresponding electrical contact mounted within the female ribbon style connector. Thus, an electrical connection will be formed between the male ribbon style connector's electrical contact beams 230, 230 and the female connector's contact beams.

Similarly, to disconnect the resilient male ribbon style connector 166 from the female connector, the male connector is simply pulled from the female connector. Once the male ribbon style connector 166 has been removed, the contact beams 230,230 will resiliently regain the configuration of FIG. 9, whereby the second end 236 of each contact beam will abut its corresponding frontstop 248.

Figure 10:
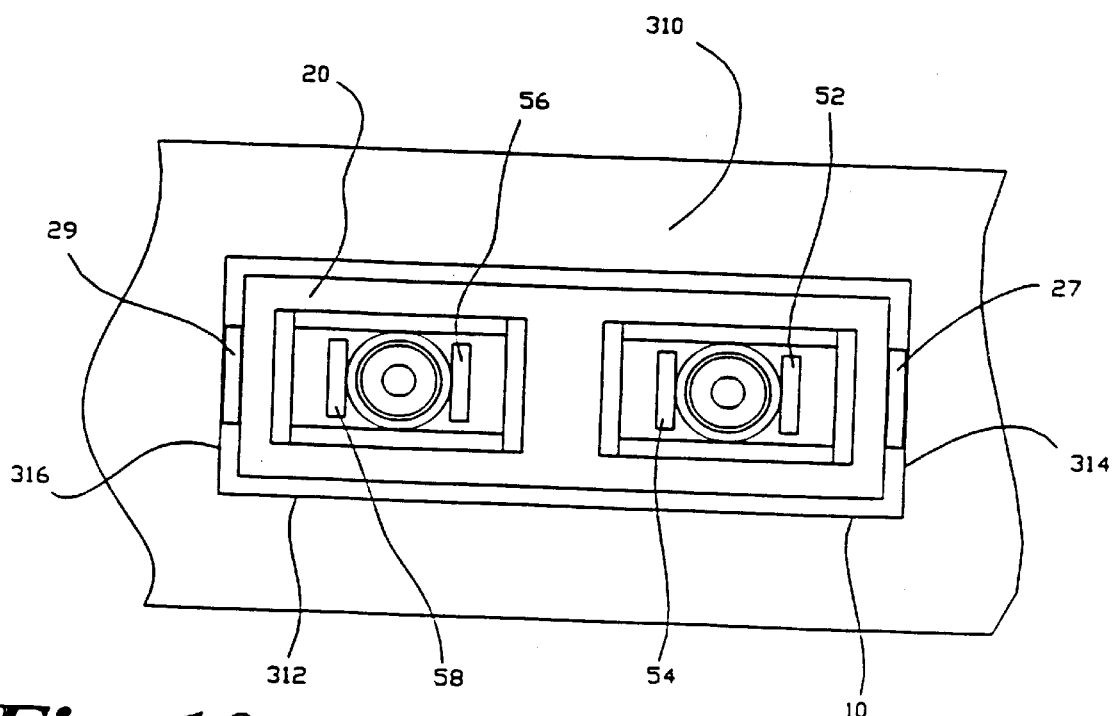
FIG. 10 is a front view of a grounded computer chassis with the optoelectronic transceiver module of FIG. 2 extending through a connector port within the computer chassis.

Moving to FIG. 10, a front view of the outside of a grounded computer chassis 310 is depicted with the connector 20 of the optoelectronic transceiver module 10 extending through a connector port 312 within the computer chassis. As commonly known in the art, the computer chassis 310 is typically made of a conductive metallic material and is tied to a ground potential (i.e., grounded) by conventional means. Furthermore, the chassis provides a connector port 312 for each optoelectronic transceiver module mounted within the computer chassis (only one connector port and one transceiver module is depicted in FIG. 10). As shown in FIG. 10, the connector port 312 consists of an opening which is dimensioned so that the transceiver module connector 20 can extend through the connector port. Therefore, the transceiver module 10 can be mounted within the chassis 310 of a computer with the transceiver module connector 20 extending from, and being readily accessible from, the outside of the computer chassis.

Correspondingly, when the transceiver module connector 20 is positioned within the connector port 312, the tabs 27,29 will press against the sides 314,316 of the connector port. Consequently, the tabs 27,29 will form an electrical connection with the computer chassis which will result in the transceiver module connector 20 becoming grounded. In addition, the entire metalized potting box, including the metalized latch members 52,54,56, and 58, will become grounded since, as indicated previously, the transceiver module connector 20 is conductively attached to the potting box.

Correspondingly, a means of pre-grounding an SC connector is provided by the grounded latch members 52,54,56, and 58. For example, as an SC connector is attached to the transceiver module 10, the housing of the SC connector will first abut against one of the ground latch members 52,54,56, and/or 58. Accordingly, any static charge on the SC connector will be removed by the grounded latched members via the conductive electrical path from the potting box, to the transceiver connector, its corresponding grounding clip, and then to the grounded computer chassis via the tabs 27,29. Therefore, the SC connector is pre-grounded before it is connected to the electronics within the transceiver module.

Although, the preferred embodiment of pre-grounding an optical connector describes a transceiver module which consists of a metalized potting box with metalized latches, it should be understood that the above invention extends to any type of optoelectronic module, such an a GLM module, which has latches for mating with a fiber optic connecter including, but not limited to, an SC connector. Correspondingly, the latches of a transceiver module, such as a GLM module, must be metalized in order to provide an electrically conductive path to the grounded computer chassis.

Furthermore, although a grounding clip having tabs was used in the preferred embodiment of the present invention to form an electrical connection with the grounded computer chassis, it should be understood by those skilled in the art that other alternative structures can be substituted for the grounding clip, such as, for example, a conductive cable which can be connected to both the computer chassis and the metalized potting box or its connector. Further, although a preferred embodiment of the inventions is an optoelectronic transceiver, any transceiver may use the features of the present invention, such as a transceiver transfers data over a copper wire/medium.

In addition, it should be understood that in describing the top and bottom portions of the transceiver module and its respective potting box components, the terms "top" and "bottom" are used by way of example only due to the orientation of the drawings. It should also be understood that various changes and modifications to the presently preferred embodiments described herein will be apparent to those skilled in the art. Furthermore, although the transceiver module depicted in the presently preferred embodiment has its male ribbon style connector extending from the bottom, it should be understood from the outset that the connector can be configured to extend, for example, from the second end of the transceiver. Therefore, changes and modifications may be made without departing from the spirit and scope of the present invention and without diminishing its attendant advantages. Thus, it is intended that such changes and modifications be covered by the appended claims.

We claim:

1. An optoelectronic module mounted within a grounded structure, said optoelectronic module comprising:

a) means for forming an electrical connection with said grounded structure;

b) the module having a housing and an optoelectronic subassembly; and c) said electrical connection forming means including a grounding clip having a tab extending therefrom, the grounding clip abutting against a connector port of the grounded structure and establishing a direct mechanical and electrical contact between the module and the connector port of said grounded structure.

2. The opotelectronic module of claim 1, further comprising a connector connected to said housing.

3. The optoelectornic module of claim 2, wherein said connector is an SC duplex connector receptacle.

4. The optoelectronic module of claim 2, further comprising a grounding clip attached to said connector.

5. The optoelectronic module of claim 1, wherein said electrical connection forming means further consists of the grounding clip providing a friction fit with an opening of the faceplate of the grounded structure.

6. The optoelectronic module of claim 5, wherein said electrical connection forming means further consists of a connector having said grounding clip attached thereto and being conductively connected to said module.

7. An optoelectronic module mounted within an enclosed grounded structure, the ground structure having an external wall, said optoelectronic module comprising:
   a) a metallic housing having an optoelectronic subassembly mounted therein; and
   b) a grounding clip forming an electrical connection between said metallic housing and said grounded structure, the grounding clip abutting against a connector port of the metallic housing and directly mechanically and electrically contacting the connector port of said metallic housing.

8. The optoelectronic transceiver module of claim 7, further comprising a metallic transceiver connector attached to said module.

9. The optoelectronic transceiver module of claim 8 comprising a grounding clip attached to said transceiver connector.

10. The optoelectronic module of claim 9, further comprising at least one tab extending from said grounding clip.

11. The optoelectronic transceiver module of claim 7, wherein said electrical connection forming means consists of at least one tab conductively connected to said module.

12. The optolectronic tranceiver module of claim 11, wherein said electrical connection forming means further consists of a grounding clip having said tab extending therefrom and being conductively connected to said metallic housing.

13. The optoelectronic transceiver module of claim 12, wherein said electrical connection forming means further consists of a transceiver connector having said grounding clip attached thereto and being conductively connected to said module.

14. An optoelectronic module mounted within a grounded chassis, said module comprising:
   a) a connector at a first end of the module having a grounding clip attached thereto and a tab extending from the grounding clip abutting against a connector port of the grounded chassis and providing electrical and mechanical contact directly with the connector port of said grounded chassis so that a portion of the module is at chassis ground;
   b) an optical transmitter/receiver mounted within the module adjacent a ferrule receiving bore at the first end; and
   c) the grounding chip conductively connected to the ferrule receiving bore.

15. The module of claim 14, further comprising a connector and a ferrule receiving bore mounted within the connector and the grounding clip conductively connected to the ferrule receiving bore.

16. The transceiver module of claim 15, further comprising the grounding clip attached to said connector.

17. The transceiver module of claim 16, further comprising at least one tab extending from said grounding clip.

18. A system for providing static discharge, said system comprising:
   a metallic chassis at ground potential having a connector port; and
   an optical module mounted to said chassis having a grounding member attached to a housing of the module, said grounding member including a grounded clip abutting and directly contacting the connector port of said chassis and wherein upon mating of the module to said chassis an electrical path from said housing to said chassis provides for a means of dissipating static discharge to said chassis.

19. A system for providing electromagnetic shielding, said system comprising:
   an electronic enclosure including a metallic chassis at ground potential having a connector port; and
   an optical module having a housing and a grounding member attached to said housing and directly connected to a connector port of the metallic chassis to which said module is attached, wherein upon mating of the module to the chassis a grounding clip of said grounding member abuts the connector port and directly electrically and mechanically connects the connector port so that an electrical path from said module to said chassis establishes a metallic portion of the module at the same ground potential as the chassis.

20. An optoelectronic module mounted within a grounded chassis, the optoelectronic module comprising:
   a housing having a first end and a second end;
   a conductive grounding member including a grounding clip abutting a connector port of the grounded chassis and making direct mechanical and electrical contact to the connector part grounding a potion of the module directly to the chassis when the module is mounted therein;
   a circuit board mounted within the housing and an optical subassembly electrically connected to the circuit board at the first end; and
   electrical contacts adjacent the second end, connected to the circuit board.

21. The module of claim 20 wherein the module housing is metallized plastic.

22. The module of claim 20 wherein a male ribbon style electrical connector, is mounted at the second end.

23. The module of claim 20 wherein the grounding member includes a metallic mounting member protruding from a bottom of the module for mounting to a printed circuit board.

* * * * *

UNITED STATES PATENT AND TRADEMARK OFFICE
CERTIFICATE OF CORRECTION

PATENT NO. : 5,864,468
DATED : January 26, 1999
INVENTOR(S) : Daniel D. Poplawski, et. al.

It is certified that error appears in the above-identified patent and that said Letters Patent is hereby corrected as shown below:

In Claim 4, Col. 11, Li. 12
    "a" to --the--

In Claim 7, Col. 11, Li. 22
    "ground" to --grounded--

In Claim 7, Col. 11, Li. 29
    "metallic housing" to --grounded structure--

In Claim 7, Col. 11, Li. 31
    "metallic housing" to --grounded structure--

In Claim 9, Col. 11, Li. 36
    "a" to --the--

In Claim 11, Col.11, Li. 41
    "electrical connection forming means" to --grounding clip--

In Claim 12, Col. 11, Li. 44
    omit "wherein said electrical connection forming means"

UNITED STATES PATENT AND TRADEMARK OFFICE
CERTIFICATE OF CORRECTION

PATENT NO. : 5,864,468           Page 2 of 2
DATED     : January 26, 1999
INVENTOR(S) : Daniel S. Poplawski, et. al.

It is certified that error appears in the above-identified patent and that said Letters Patent is hereby corrected as shown below:

In Claim 13, Col. 11, Li. 49
 omit "wherein said electrical connection forming means"

In Claim 14, Col. 12, Li. 1
 "chip" to --clip--

In Claim 18, Col. 12, Li. 19
 "grounded" to --grounding--

In Claim 19, Col. 12, Li. 36
 "connects" to --contacts--

In Claim 20, Col.12 the Li.47
 "part" to --port--   and   "potion" to --portion--

Signed and Sealed this

Twenty-seventh Day of June, 2000

Attest:

Q. TODD DICKINSON

Attesting Officer     Director of Patents and Trademarks